United States Patent
Seo et al.

(10) Patent No.: US 9,301,287 B2
(45) Date of Patent: Mar. 29, 2016

(54) METHOD AND DEVICE FOR TRANSMITTING UPLINK CONTROL INFORMATION IN A WIRELESS COMMUNICATION SYSTEM

(75) Inventors: Dong Youn Seo, Anyang-si (KR); Joon Kui Ahn, Anyang-si (KR); Suck Chel Yang, Anyang-si (KR); Min Gyu Kim, Anyang-si (KR); Dae Won Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 13/806,468

(22) PCT Filed: Jun. 24, 2011

(86) PCT No.: PCT/KR2011/004622
§ 371 (c)(1), (2), (4) Date: Dec. 21, 2012

(87) PCT Pub. No.: WO2011/162568
PCT Pub. Date: Dec. 29, 2011

(65) Prior Publication Data
US 2013/0100917 A1    Apr. 25, 2013

Related U.S. Application Data

(60) Provisional application No. 61/357,987, filed on Jun. 24, 2010, provisional application No. 61/360,872, filed on Jul. 1, 2010, provisional application No. 61/390,157, filed on Oct. 5, 2010.

(51) Int. Cl.
| | |
|---|---|
| *H04W 72/04* | (2009.01) |
| *H04W 72/12* | (2009.01) |
| *H04W 72/14* | (2009.01) |
| *H04L 5/00* | (2006.01) |
| *H04W 72/08* | (2009.01) |
| *H04W 72/10* | (2009.01) |

(52) U.S. Cl.
CPC ........ *H04W 72/0413* (2013.01); *H04W 72/087* (2013.01); *H04W 72/10* (2013.01); *H04W 72/1284* (2013.01); *H04L 5/0053* (2013.01)

(58) Field of Classification Search
CPC .......... H04W 72/0413; H04W 72/042; H04W 72/10; H04W 72/087
USPC ........................................................ 370/329
See application file for complete search history.

(56) References Cited

U.S. PATENT DOCUMENTS

2005/0195791 A1    9/2005  Sung et al.
2008/0188228 A1 *  8/2008  Pecen et al. ................. 455/449
(Continued)

FOREIGN PATENT DOCUMENTS

| KR | 10-2005-0067331 A | 7/2005 |
|----|---------------------|--------|
| KR | 10-2005-0089709 A | 9/2005 |

(Continued)

*Primary Examiner* — Marcus R Smith
*Assistant Examiner* — Peian Lou
(74) *Attorney, Agent, or Firm* — Birch, Stewart, Kolasch & Birch, LLP

(57) ABSTRACT

Provided are a method and device for transmitting uplink control information in a wireless communication system. A terminal determines a feedback cell where uplink transmission blocks and uplink control information are multiplexed, from among a plurality of serving cells. The terminal multiplexes the uplink transmission blocks and the uplink control information on an uplink shared channel of the feedback cell, and the multiplexed uplink control information is transmitted on the uplink shared channel of the feedback cell.

13 Claims, 13 Drawing Sheets

(56) References Cited

U.S. PATENT DOCUMENTS

| | | | |
|---|---|---|---|
| 2008/0287138 A1* | 11/2008 | Yoon et al. | 455/452.2 |
| 2010/0124179 A1* | 5/2010 | Lee et al. | 370/252 |
| 2010/0271970 A1* | 10/2010 | Pan et al. | 370/252 |
| 2011/0141928 A1* | 6/2011 | Shin et al. | 370/252 |

FOREIGN PATENT DOCUMENTS

| | | |
|---|---|---|
| KR | 10-2008-0073616 A | 8/2008 |
| KR | 10-2009-0088273 A | 8/2009 |

\* cited by examiner

US 9,301,287 B2

METHOD AND DEVICE FOR TRANSMITTING UPLINK CONTROL INFORMATION IN A WIRELESS COMMUNICATION SYSTEM

CROSS REFERENCE TO RELATED APPLICATIONS

This application is the National Phase of PCT/KR2011/004622 filed on Jun. 24, 2011, which claims priority under 35 U.S.C. §119(e) to U.S. Provisional Application Nos. 61/357,987 filed on Jun. 24, 2010, 61/360,872 filed on Jul. 1, 2010, and 61/390,157 filed on Oct. 5, 2010, all of which are hereby expressly incorporated by reference into the present application.

FIELD OF THE INVENTION

The present invention relates to wireless communications, and more particularly, to a method and apparatus for transmitting uplink control information in a wireless communication system.

BACKGROUND OF THE INVENTION

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One uplink component carrier and one downlink component carrier are mapped to one cell. When a user equipment receives a service by using a plurality of downlink component carriers, it can be said that the user equipment receives the service from a plurality of serving cells.

The 3GPP LTE provides a PUCCH used for transmission of uplink control information. In order to maintain a low peak-to-average power ratio (PAPR) property, simultaneous transmission of the PUCCH and a PUSCH is not allowed. Therefore, if transmission of the uplink control information is requested in a subframe in which the PUSCH is scheduled, the uplink control information is transmitted by multiplexing the uplink control information to the PUSCH.

However, since a plurality of serving cells are used in a multi-carrier system, it may be ineffective to directly use a channel structure of a single-carrier system.

SUMMARY OF THE INVENTION

The present invention provides a method and apparatus for transmitting uplink control information by using a piggyback cell selected from a plurality of serving cells in a wireless communication system.

Technical Solution

In an aspect, a method of transmitting uplink control information in a wireless communication system is provided. The method includes determining a piggyback cell in which an uplink transport block and the uplink control information are multiplexed among a plurality of serving cells, multiplexing the uplink transport block and the uplink control information on an uplink shared channel of the piggyback cell, and transmitting the multiplexed uplink control channel on the uplink shared channel of the piggyback cell.

The piggyback cell may be indicated by an uplink grant for the uplink shared channel.

The uplink grant may include a piggyback indicator for indicating whether the uplink control information is multiplexed, and the serving cell in which multiplexing is indicated by the piggyback indicator may be determined to the piggyback cell.

The uplink grant may include a channel quality indicator (CQI) request for requesting a CQI report, and a serving cell in which the CQI request is triggered may be determined to the piggyback cell.

The determining of the piggyback cell may include determining a top-priority cell, in which the uplink shared channel is scheduled, to the piggyback cell among the plurality of serving cells.

The determining of the piggyback cell may include if the uplink shared channel of the top-priority cell is not scheduled, determining at least one scheduled serving cell in which the uplink shared channel is scheduled among the plurality of serving cells, and determining a cell having a lowest index to the piggyback cell among the at least one scheduled serving cell.

In another aspect, a wireless apparatus for transmitting uplink control information in a wireless communication system is provided. The wireless apparatus includes a radio frequency (RF) unit for transmitting and receiving a radio signal, and a processor operatively coupled to the RF unit and configured for determining a piggyback cell in which an uplink transport block and the uplink control information are multiplexed among a plurality of serving cells, multiplexing the uplink transport block and the uplink control information on an uplink shared channel of the piggyback cell, and transmitting the multiplexed uplink control channel on the uplink shared channel of the piggyback cell.

A serving cell to be used to transmit piggyback uplink control information can be clearly known. In addition, a physical uplink shared channel (PUSCH) detection error can be decreased in a base station.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
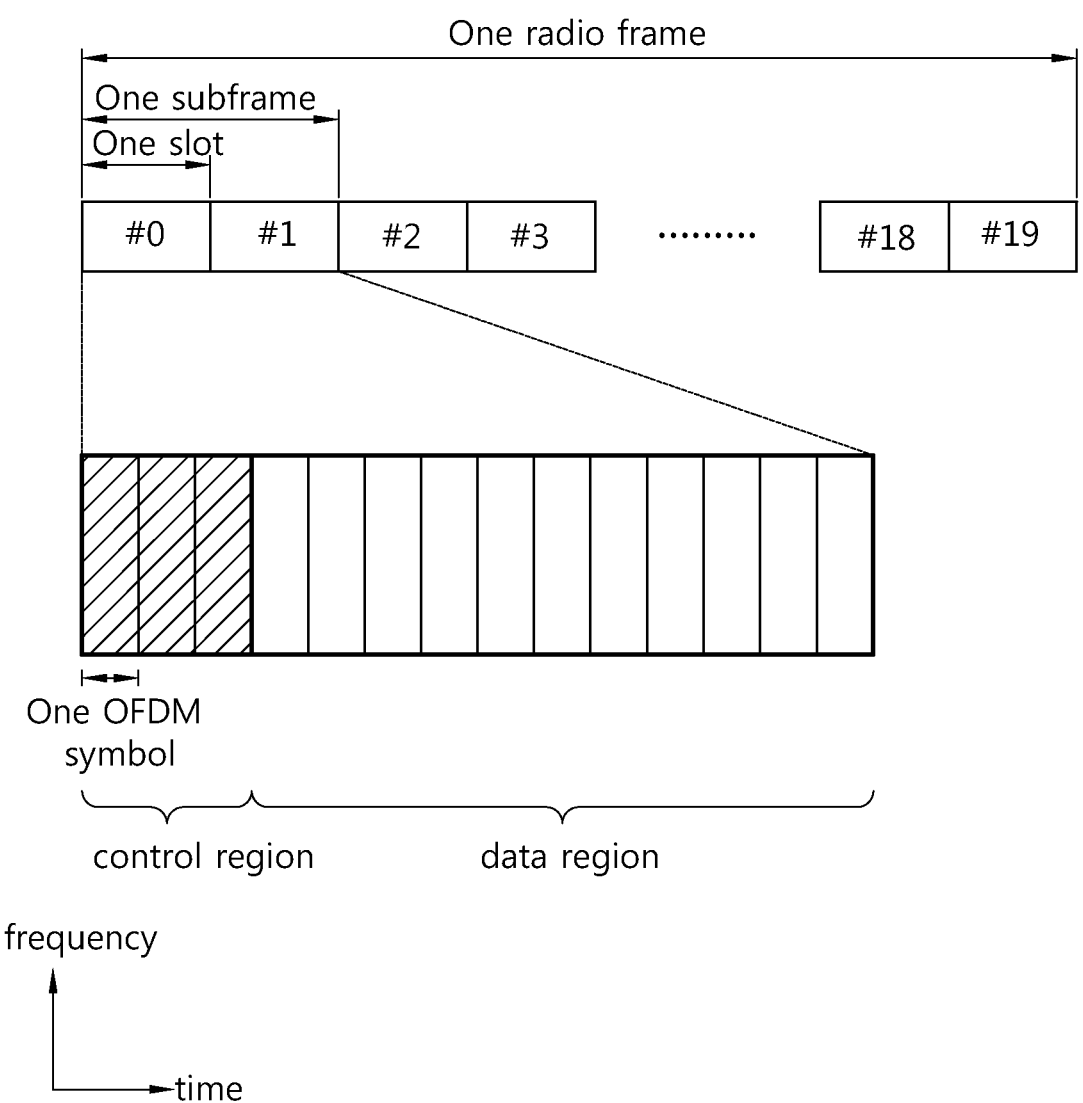
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 slots indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing cyclic redundancy check (CRC) error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
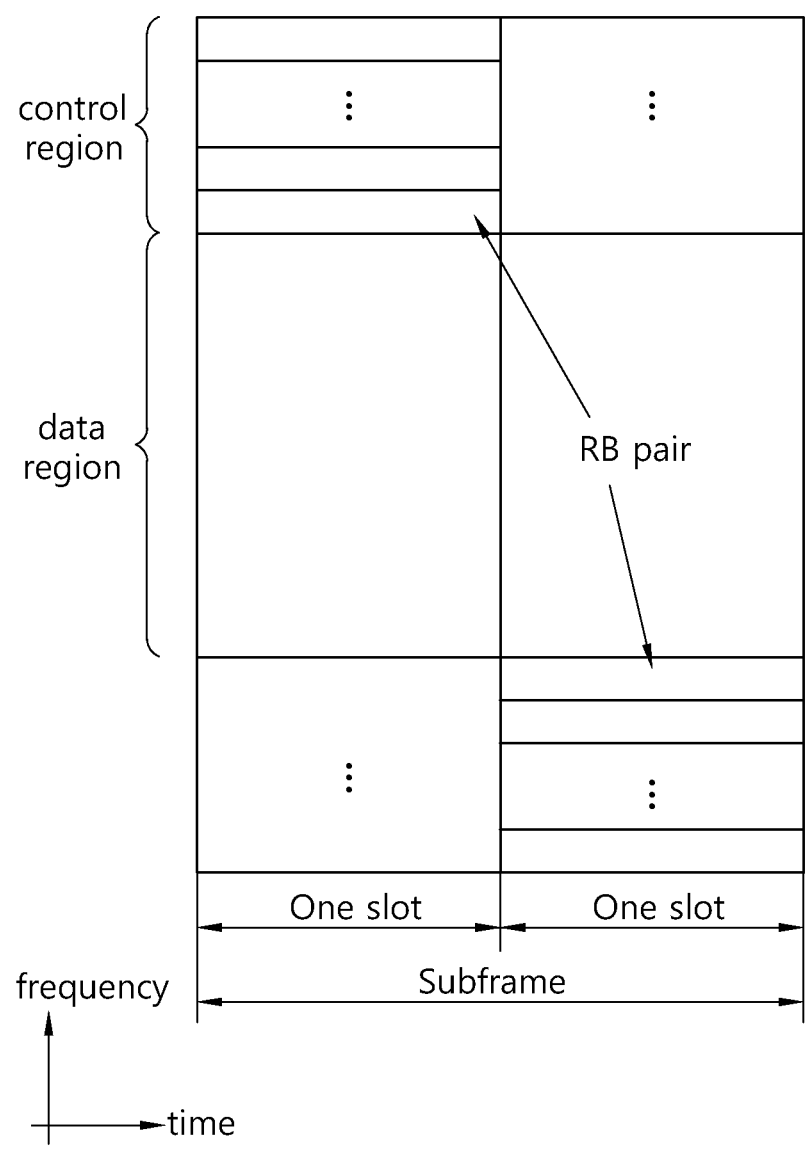
FIG. 2 shows an example of an uplink (UL) subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

In order to increase a power amplifier of a UE, 3GPP LTE applies single carrier frequency division multiple access (SC-FDMA) having a good peak-to-average power ratio (PAPR)/cubic metric (CM) property to UL transmission. For example, for PUSCH transmission, information bits are subjected to DFT-spreading and thereafter are subjected to IFFT. However, when the DFT-spread symbols are mapped to discontinuous subcarriers, a single-carrier property may deteriorate.

In order to maintain the single-carrier property, when user traffic and UL control information (or simply, UCI) are transmitted simultaneously in a specific subframe, the 3GPP LTE multiplexes and transmits the user traffic and the UCI through a PUSCH.

The multiplexed UCI includes a CQI indicating a DL channel state, a precoding matrix indicator (PMI), a rank indicator (RI), and/or ACK/NACK for HARQ.

The UL control information multiplexed to the UL transport block is called multiplexed control information or piggyback control information.

The multiplexed UCI is also called piggyback UCI.

Figure 3:
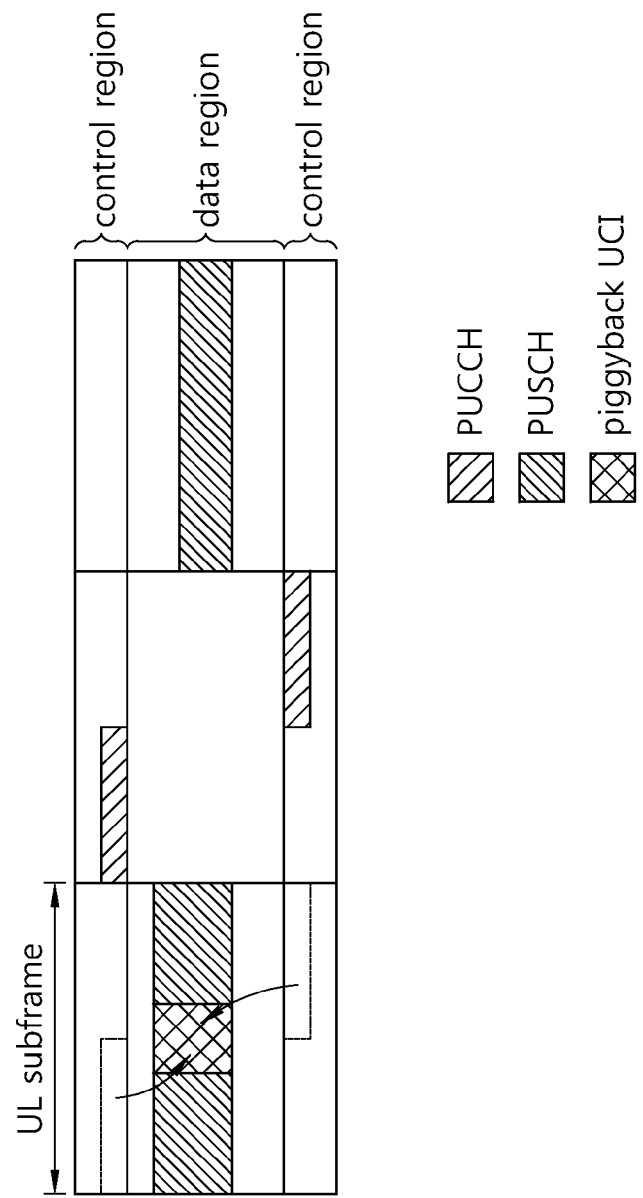
FIG. 3 shows an example of piggyback uplink control information (UCI) transmission.

FIG. 3 shows an example of piggyback UCI transmission.

A periodic channel quality indicator (CQI) is transmitted on a PUCCH, and a UL transport block is transmitted on a PUSCH. However, when the periodic CQI and the UL transport block are simultaneously transmitted in a specific subframe, the periodic CQI and the UL transport block are multiplexed and then transmitted on the PUSCH.

Figure 4:
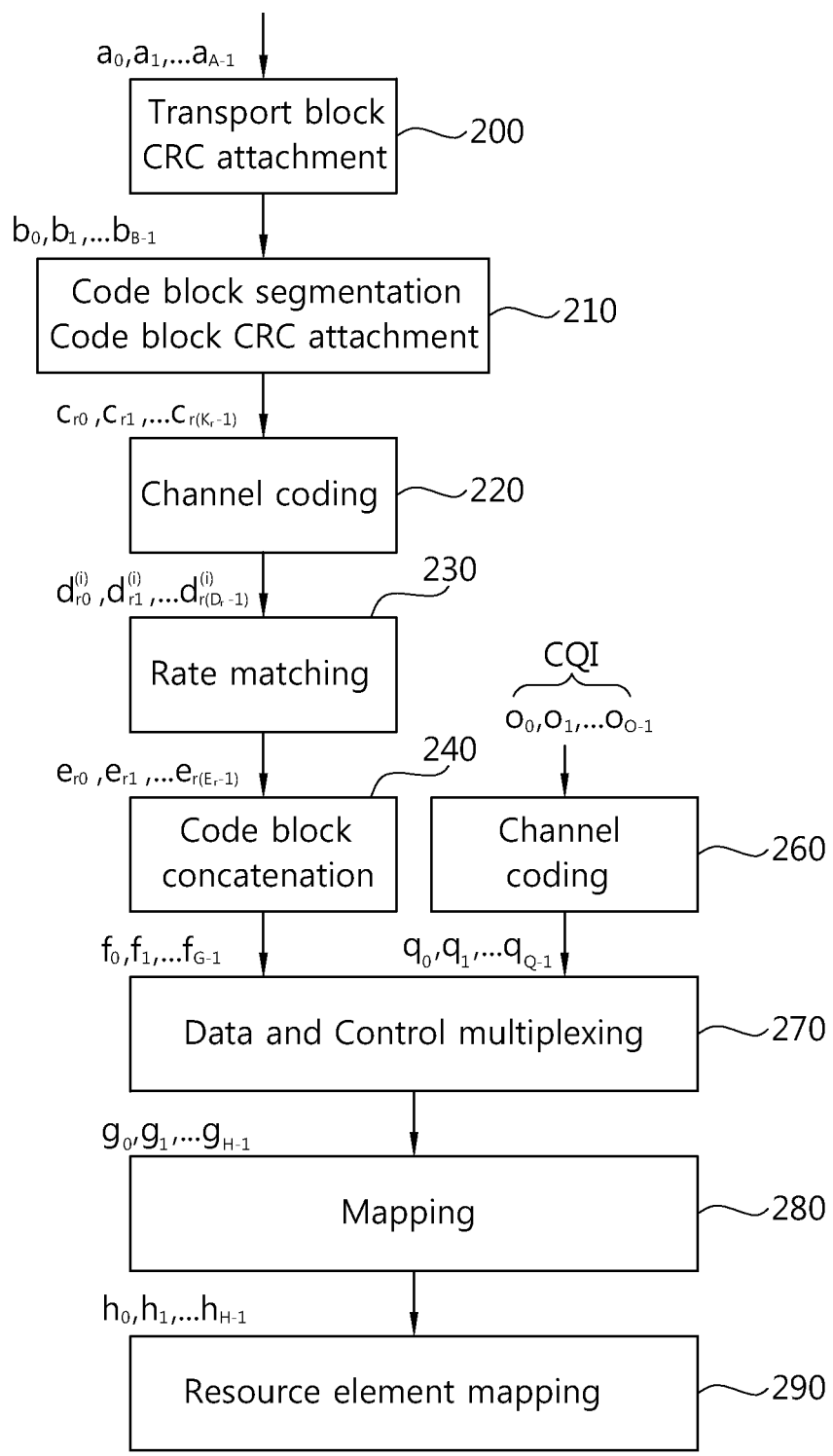
FIG. 4 shows an example of multiplexing a UL transport block and a channel quality indicator (CQI).

FIG. 4 shows an example of multiplexing a UL transport block and a CQI.

Data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$ (step 200). Herein, B=A+L. Equation 1 below shows a relationship between $a_k$ and $b_k$.

$$b_k = a_k \text{ for } k=0, 1, \ldots, A-1$$

$$b_k = p_{k-A} \text{ for } k=A, A+1, \ldots, A+L-1 \qquad \text{[Equation 1]}$$

The CRC-attached bits $b_0, b_1, \ldots, b_{B-1}$ are segmented in a code block unit, and the CRC parity bits are re-attached in the code block unit (step 210). $c_{r0}, c_{r1}, \ldots, c_{r(Kr-1)}$ denote a bit sequence output after the code block segmentation. Herein, if a total number of code blocks is C, r denotes a code block number, and Kr denotes the number of bits for the code block number r. [61] Channel coding is performed on a bit sequence for a given code block (step 220). $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits (step 230). Then, code block concatenation is performed on the rate-matched bits (step 240). As a result, a data bit sequence $f_0, f_1, \ldots, f_{G-1}$ is generated. Herein, G denotes a total number of encoded bits used to transmit bits other than bits used in control information transmission when the control information is multiplexed on a PUSCH.

Channel coding is performed on CQI values $o_0, o_1, \ldots, o_{O-1}$ (where O is the number of CQI bits) to generate a control information bit sequence $q_0, q_1, \ldots, q_{Q-1}$ (step 260). The CQI can use independent channel coding different from that used for the data. For example, when a block code (32, O) is used as channel coding for the CQI.

$b_0, b_1, \ldots, b_{31}$ denote an intermediate sequence for CQI channel coding and can be generated by Equation 2 below.

$$b_i = \sum_{n=0}^{O-1} (o_n \cdot M_{i,n}) \bmod 2, \qquad \text{[Equation 2]}$$

where $i = 0, 1, 2, \ldots, 31$

The control information bit sequence $q_0, q_1, \ldots, q_{Q-1}$ is generated by cyclically repeating the intermediate sequence $b_0, b_1, b_{31}$ according to Equation 3 below.

$$q_i = b_{(i \bmod 31)}, \text{ where } i=0, 1, \ldots, Q-1 \qquad \text{[Equation 3]}$$

A data bit sequence $f_0, f_1, \ldots, f_{G-1}$ is generated as described above and is multiplexed together with the control information bit sequence $q_0, q_1, \ldots, q_{Q-1}$ into a multiplexed sequence $g_0, g_1, \ldots, g_{H-1}$ (step 270). In a process of multiplexing, the control information bit sequence $q_0, q_1, \ldots, q_{Q-1}$ can be arranged first and thereafter the data bit sequence $f_0, f_1, \ldots, f_{G-1}$ can be arranged. That is, if H=G+Q, $[g_0, g_1, \ldots, g_{H-1}]$ may be configured such as $[q_0, q_1, \ldots, q_{Q-1}, f_0, f_1, \ldots, f_{G-1}]$.

The multiplexed sequence $g_0, g_1, \ldots, g_{H-1}$ is mapped to a modulation sequence $h_0, h_1, \ldots, h_{H'-1}$ (step 280). Herein, $h_i$ denotes a modulation symbol on constellation, and $H'=H/Q_m$. $Q_m$ denotes the number of bits for each modulation symbol of a modulation scheme. For example, when quadrature phase shift keying (QPSK) is used as the modulation scheme, $Q_m=2$.

Each modulation symbol of the modulation sequence $h_0, h_1, \ldots, h_{H'-1}$ is mapped to a resource element for the PUSCH (step 290). The modulation symbols are mapped in a time-first manner.

Figure 5:
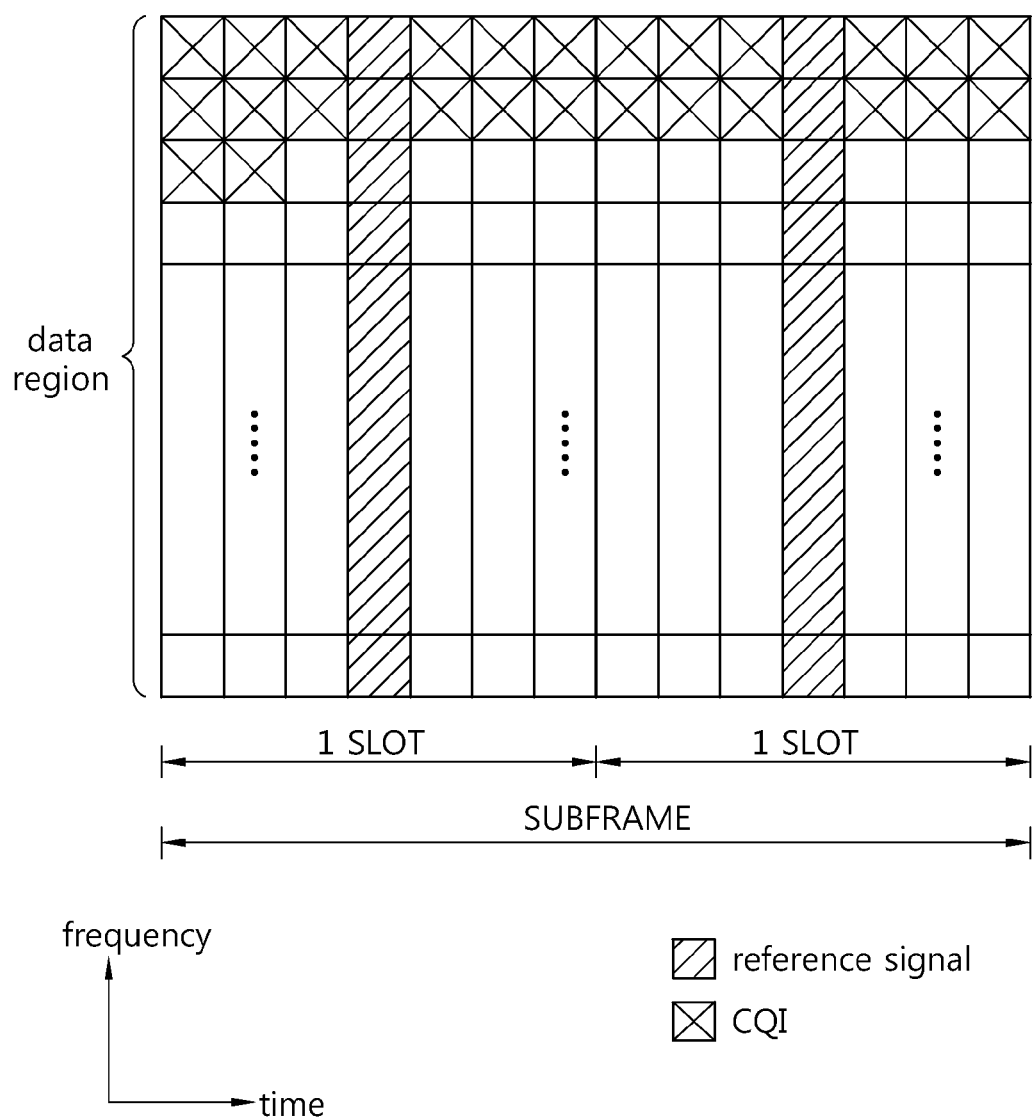
FIG. 5 shows resource mapping on a physical uplink shared channel (PUSCH).

FIG. 5 shows resource mapping on a PUSCH.

One slot includes 7 SC-FDMA symbols. In each slot, a $4^{th}$ SC-FDMA symbol is used to transmit a reference signal. Therefore, up to 12 SC-FDMA symbols can be used for the PUSCH in one subframe. A modulation sequence $h_0, h_1, \ldots, h_{H'-1}$ is first mapped in a $1^{st}$ subcarrier region in an SC-FDMA symbol direction, and is then mapped in a $2^{nd}$ subcarrier region also in the SC-FDMA symbol direction. A front portion of the modulation sequence $h_0, h_1, h_{H'-1}$ corresponds to a CQI. Thus, the CQI is first mapped to resource elements in a front subcarrier region.

The UCI such as the HARQ ACK/NACK and the RI is multiplexed by puncturing a PUSCH region. A modulation sequence to be mapped to a resource element is punctured, and the HARQ ACK/NACK and/or the RI are mapped to the punctured resource element.

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

A CC or a CC-pair may be mapped to one cell. When a synchronization signal and a PBCH are transmitted in each CC, it can be said that one DL CC is mapped to one cell.

Therefore, when a UE communicates with a BS via a plurality of CCs, it can be said that the UE receives a service from a plurality of serving cells.

Figure 6:
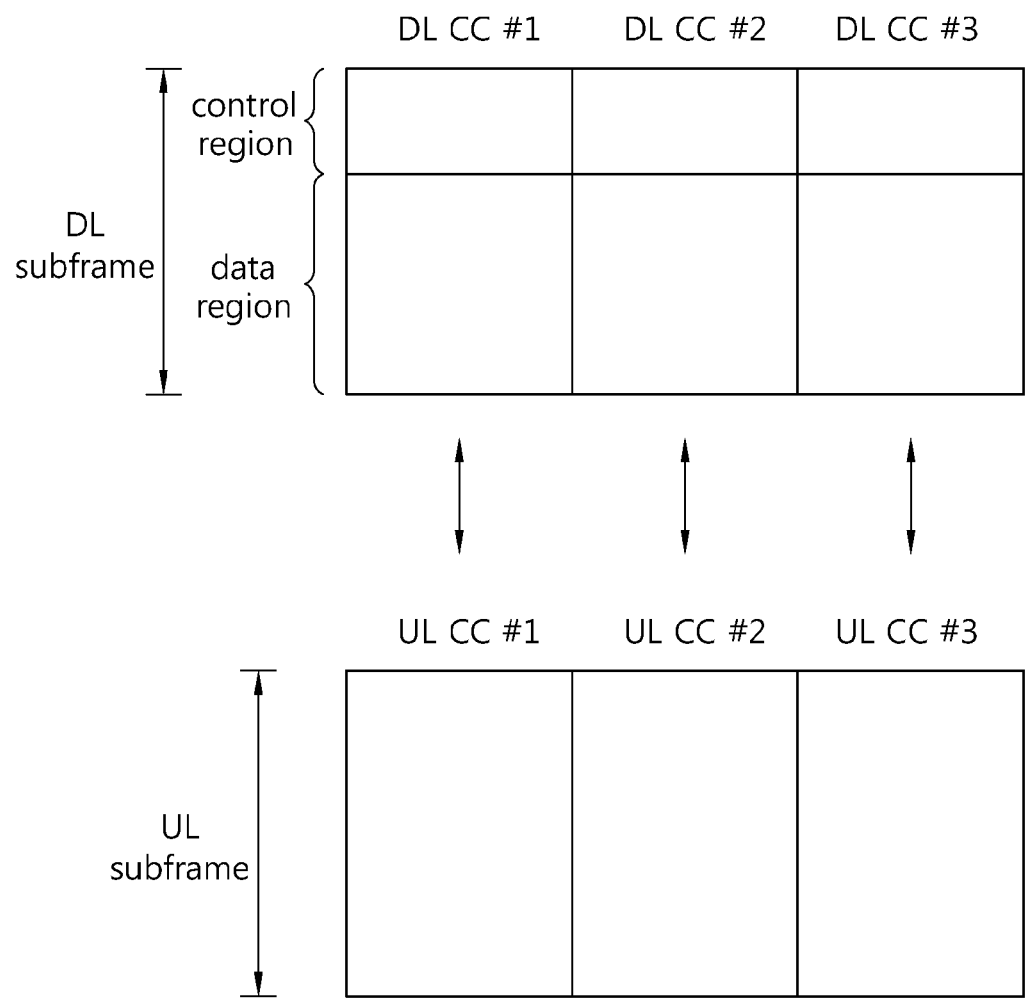
FIG. 6 shows an example of multiple carriers.

FIG. 6 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CC. The UE can transmit a plurality of UL transport blocks simultaneously via a plurality of UL CCs.

To reduce an overhead caused by PDCCH monitoring, only M (M<N) DL CCs can be monitored even if N DL CCs are supported. A CC for monitoring the PDCCH is called a monitoring CC. A set of monitoring CCs is called a monitoring CC set.

For example, if the DL CC #1 is a monitoring CC and the DL CC #2 and the DL CC #3 are non-monitoring CCs, the UE can perform blind decoding of the PDCCH only in the DL CC #1.

An assigned CC is a CC assigned by the BS to the UE according to the UE capacity among available CCs.

An activated CC is a CC used by the UE to perform reception and/or transmission of a control signal and/or data with respect to the BS. The UE can perform PDCCH monitoring and/or PDSCH buffering with respect to some or all of the activated CCs. The activated CC can be activated or deactivated among the assigned CCs. The activated CC is an activated cell, and is a serving cell.

One of the activated CCs is a reference CC. The reference CC is also called a primary CC or an anchor CC. The reference CC is a CC (or CC-pair) in which information necessary for a system operation is transmitted such as system information and/or multi-carrier operation information. In addition, the PUCCH is transmitted only via the reference CC. The reference CC is the primary CC or the reference cell.

Among a plurality of CCs assigned to the UE, a CC other than the primary CC is called a secondary CC. The secondary CC is a secondary cell.

When the UE transmits UCI or a UL transport block via a UL CC, there is a need to consider regulation such as band emission or the like and power amplifier's power backoff caused by a cubic metric (CM). If the UE ensures enough UL transmit power and is located in a close distance to the BS, the PUSCH and the PUCCH can be simultaneously transmitted via one or more UL CCs. However, if the UE is located far from the BS, it may be difficult to simultaneously transmit the PUSCH and the PUCCH since great UL transmit power is required. Therefore, the PUCCH may be preferably piggybacked on the PUSCH instead of transmitting traffic data and the UCI through different channels.

The proposed invention relates to a method of piggybacking the UCI on the PUSCH in a multi-carrier system (or a system having a plurality of cells).

It is assumed hereinafter that the PUCCH is transmitted only via the primary CC (or primary cell). Although three CCs (or cells) are taken into account, the number of CCs is not limited thereto.

Figure 7:
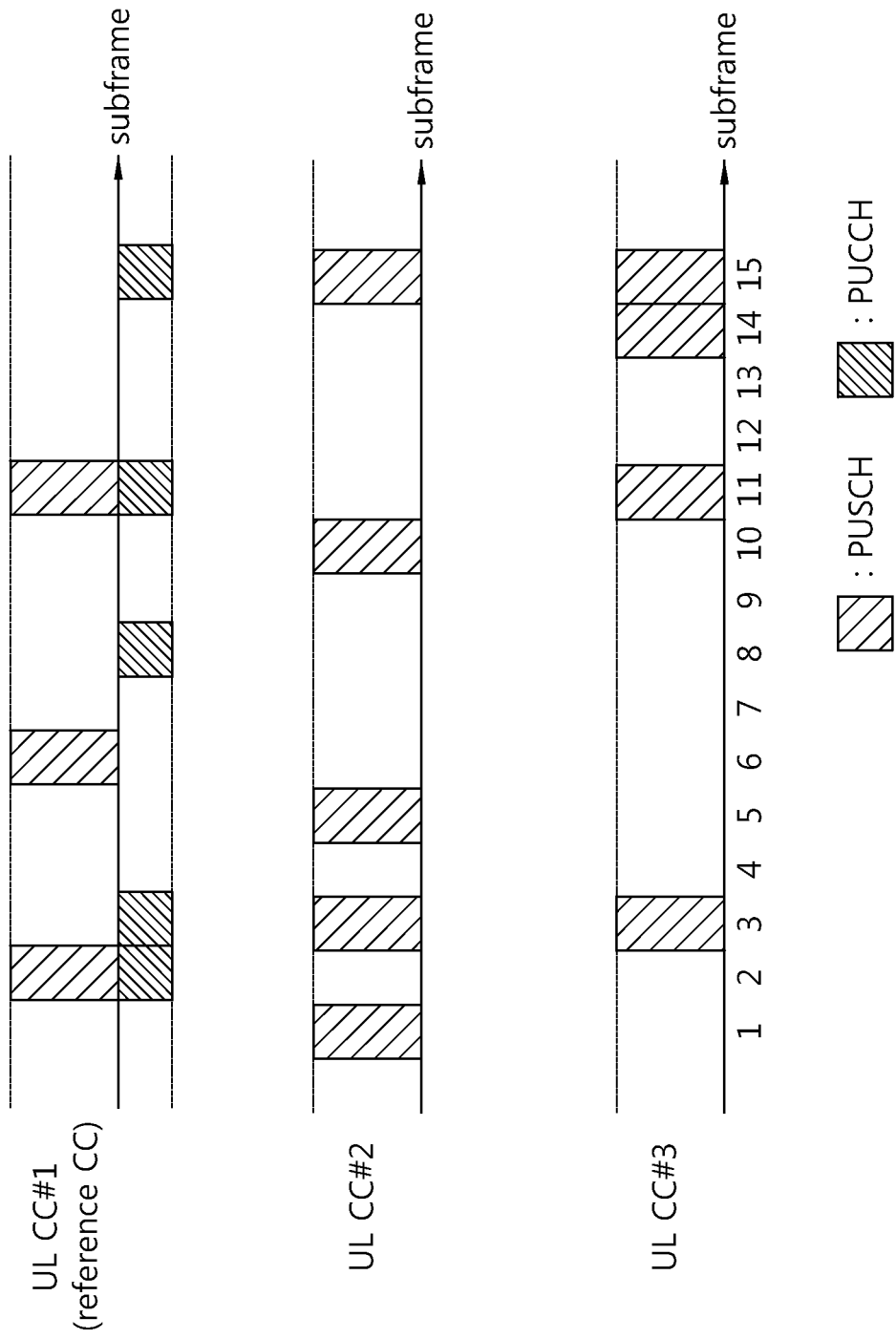
FIG. 7 shows an example of PUSCH and physical uplink control channel (PUCCH) transmission.

FIG. 7 shows an example of PUSCH and PUCCH transmission.

A UL CC #1 is a reference CC, and can transmit the PUCCH. A UL CC #2 and a UL CC #3 cannot transmit the PUCCH.

In subframes 2 and 11 of the UL CC #1, the PUSCH and the PUCCH are simultaneously transmitted. In this case, considering a CM aspect, UCI can be preferably piggybacked on the PUSCH instead of separately transmitting the PUSCH and the PUCCH.

However, in the subframe 11, the PUSCH is also transmitted in a UL CC #3. That is, in the subframe 11, the UL CC #1 and the UL CC #2 are both scheduled. In this case, which CC will be used to piggyback the piggyback UCI is ambiguous.

In the embodiment of the present invention, a BS can indicate to a UE about which CC (or cell) will be used to piggyback the piggyback UCI. An indicator for indicating a cell in which the piggyback UCI is piggybacked is called a piggyback indicator (PI). The PI can be transmitted by using an RRC message, a MAC message, or a PDCCH.

Figure 8:
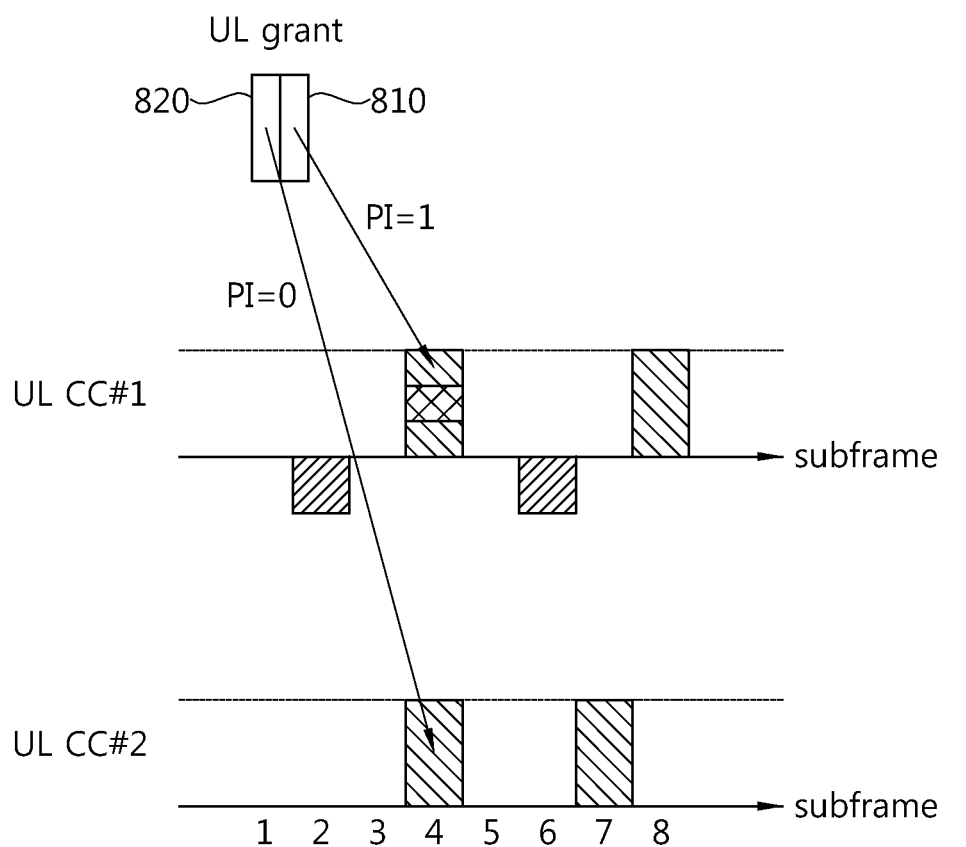
FIG. 8 shows control information transmission according to an embodiment of the present invention.

FIG. 8 shows control information transmission according to an embodiment of the present invention.

A UL grant (or a DL resource allocation) on a PDCCH includes a piggyback indicator. The piggyback indicator is 1 bit. For example, if a value of the piggyback indicator is '1', piggyback UCI is transmitted, and if the value of the piggyback indicator is '0', the piggyback UCI is not transmitted.

A first UL grant 810 includes a PUSCH resource allocation for a UL CC #1. In addition, the first UL grant 810 includes a piggyback indicator for indicating piggyback UCI transmission. For example, if HARQ ACK/NACK is transmitted in a subframe 4, a PUSCH can be used for the piggyback.

A CC (or cell) for which piggyback UCI transmission is indicated is called a piggyback CC (or piggyback cell).

A second UL grant 820 includes a PUSCH resource allocation for a UL CC #2. In addition, the second UL grant 820 includes a piggyback indicator to indicate that piggyback UCI transmission is impossible.

In a second embodiment of the present invention, a BS can indicate to a UE about which CC (or cell) will be used to piggyback the piggyback UCI by using a CQI request.

As disclosed in the section 7.2.1 of 3GPP TS 36.213 V8.7.0 (2009-05), a CQI transmitted by the UE at the request of the BS is called an aperiodic CQI. In comparison thereto, a periodic CQI is a CQI of which a period for transmitting the CQI by the BS to the UE is predetermined. A CQI request is information used for triggering the aperiodic CQI. The CQI request is included in a UL grant or a random access response. When a value of the CQI request is triggered, the aperiodic CQI is triggered.

Figure 9:
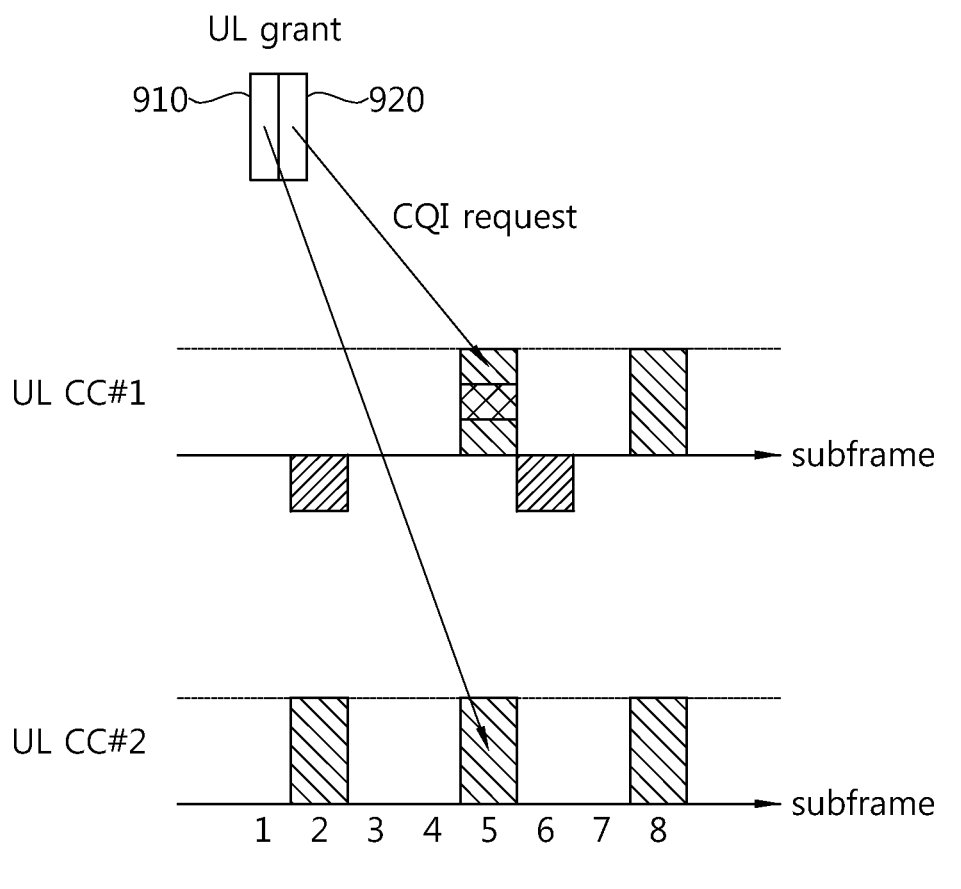
FIG. 9 shows control information transmission according to another embodiment of the present invention.

FIG. 9 shows control information transmission according to another embodiment of the present invention.

A first UL grant 910 includes PUSCH resource allocation for a UL CC #1 and triggering of a CQI request. A second UL grant 920 includes PUSCH resource allocation for a UL CC #2, but the CQI request is not triggered.

Therefore, a UE transmits piggyback UCI in the UL CC #1.

Since one DL CC or a DL CC-UL CC pair constitutes one cell, a cell used in UCI transmission has the same concept as a CC. Hereinafter, the cell and the CC are collectively called the cell.

In a third embodiment of the present invention, a BS and a UE can determine a cell in which the piggyback UCI is transmitted on the basis of a pre-defined rule.

Figure 10:
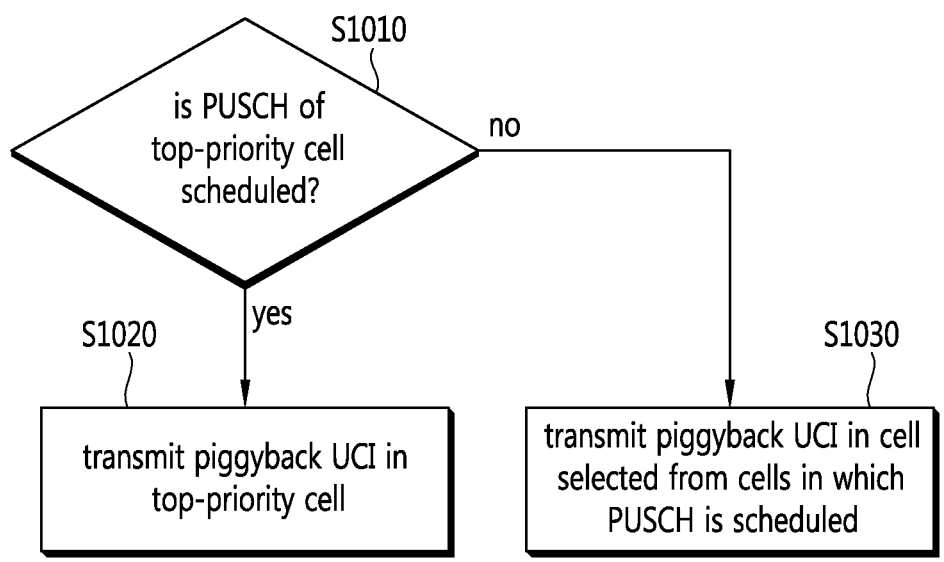
FIG. 10 is a flowchart showing control information transmission according to another embodiment of the present invention.

FIG. 10 is a flowchart showing control information transmission according to another embodiment of the present invention.

A UE determines whether a PUSCH of a top-priority cell is scheduled (step S1010). The priority is used to determine a cell used for transmission of piggyback UCI. When a UL grant of the top-priority cell is received or the PUSCH is transmitted by using semi-persistent scheduling (SPS), the UE determines that the PUSCH is scheduled.

If the PUSCH of the top-priority cell is scheduled, the UE multiplexes the piggyback UCI on the top-priority PUSCH, and transmits the piggyback UCI (step S1020).

Otherwise, if the PUSCH of the top-priority cell is not scheduled, the UE selects one of cells in which the PUSCH is scheduled, multiplexes the piggyback UCI on a PUSCH of the selected cell, and transmits the piggyback UCI (step S1030).

When the PUSCH is scheduled in the plurality of cells, the UE can select a cell on the basis of a cell index of each cell. Each cell has a unique cell index (e.g., a physical cell index (PCI)). For example, the UE can select a cell having a lowest cell index among the cells in which the PUSCH is scheduled. Alternatively, the UE can select a cell having a highest cell index among the cells in which the PUSCH is scheduled.

One or more cells can be designated as the top-priority cell, and can be designated by one of the following criteria.

(1) A cell in which the PUCCH can be transmitted.
(2) A primary cell.
(3) A cell having a widest bandwidth.
(4) A cell which is reported by a BS to a UE as the top-priority cell.

The above three embodiments can be combined. For example, a cell indicated by a piggyback indicator (such a cell is called a piggyback cell), a cell indicated by a CQI request (such a cell is called a triggered piggyback cell), and a cell selected by a pre-defined rule (such a cell is called a selected piggyback cell) can exist at the same time.

For transmission of the piggyback UCI, a priority can be assigned in each embodiment. For example, a cell can be designated in the order of the indicated piggyback cell>the triggering piggyback cell>the selected piggyback cell.

A plurality of triggering piggyback cells can be designated due to triggering of a plurality of CQI requests. One cell can be selected for transmission of the piggyback UCI among the plurality of triggering piggyback cells on the basis of the pre-defined rule.

A cell to be piggybacked can be determined according to information included in the UCI. HARQ ACK/NACK may be information which is more important than the CQI.

If the UCI includes the HARQ ACK/NACK (herein, the UCI may further include the CQI), the UE transmits the UCI via the indicated piggyback cell. If there is no indicated piggyback cell, the UE transmits the UCI via the selected piggyback cell.

If the UCI includes only the CQI, the UE transmits the UCI via the triggering piggyback cell. If there is no triggering piggyback cell, the UE transmits the UCI via the selected piggyback cell.

Whether to perform the piggyback can be determined according to a method of multiplexing the UCI to the PUSCH. As described above with reference to FIG. 4, the HARQ ACK/NACK and the RI are multiplexed by puncturing a payload transmitted on a PUSCH (herein, the UCI is called punctured UCI). The CQI is multiplexed by using the payload (i.e., a UL transport block) transmitted on the PUSCH and rate matting (herein, the UCI is called coded UCI). A location at which transmission of the payload of the PUSCH starts varies according to whether the CQI is multiplexed. This implies that, if the BS does not know whether the CQI is multiplexed, blind decoding must be performed for the PUSCH at least two times (i.e., one time under the assumption that the CQI is present, and one time under the assumption that the CQI is not present) in order to receive the payload of the PUSCH. Therefore, whether to perform the piggyback can be determined according to the UCI which has an effect on PUSCH detection.

More specifically, if the indicated piggyback cell and/or the triggering piggyback cell are present, since it implies that the BS has designated the cell to be piggybacked, all types of UCI can be piggybacked irrespective of a multiplexing scheme.

If only the selected piggyback cell is present, the punctured UCI is piggybacked, but the coded UCI is not piggybacked. If the UE selects a cell according to the pre-defined rule due to a loss of a UL grant or the like even if the BS has designated the indicated piggyback cell, the cell to be piggybacked is mismatched between the BS and the UE. The BS expects the piggyback UCI from the indicated piggyback cell, but the UE transmits the piggyback UCI to the selected piggyback cell. This may cause an error in PUSCH detection. Therefore, only the punctured UCI which does not have an effect on the PUSCH detection may be piggybacked.

If the selected piggyback cell is the top-priority cell, the UE can piggyback all types of UCI.

Figure 11:
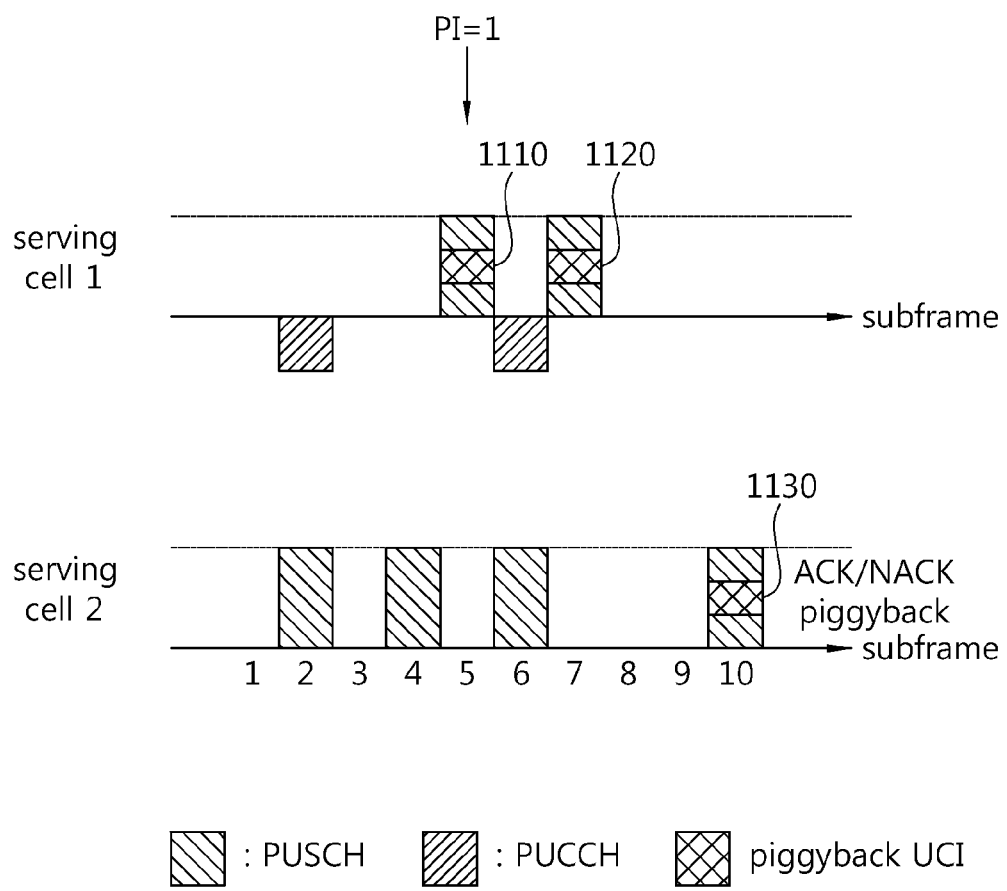
FIG. 11 shows control information transmission according to another embodiment of the present invention.

FIG. 11 shows control information transmission according to another embodiment of the present invention. It is assumed that a serving cell 1 is a primary cell and has a top priority.

In a subframe 5, a BS indicates the serving cell 1 by using a piggyback indicator. Therefore, the UE transmits a piggyback UCI 1110 via the serving cell 1.

In a subframe 7, although the piggyback indicator is not received and a CQI request is not triggered, since the serving cell 1 has the top priority, the UE transmits a piggyback UCI 1120 via the serving cell 1.

In a subframe 10, since a PUSCH is not scheduled in the serving cell 1, the UE transmits a piggyback UCI 1130 via a serving cell 2. The piggyback UCI 1130 may include HARQ ACK/NACK but may not include a CQI. That is, even if the subframe 10 is a subframe in which the CQI (e.g., periodic CQI) can be reported, the CQI is not piggybacked but dropped.

In another embodiment, if the PUSCH is scheduled in the primary cell, the piggyback UCI can be always transmitted in the primary cell. When the UE uses a narrowband power amplifier for each CC, simultaneous transmission of PUSCH/PUCCH has no problem in different CCs. However, simultaneous transmission of PUSCH/PUCCH in one CC may cause a power back-off problem in the power amplifier of the CC. Therefore, in order to avoid simultaneous transmission of PUSCH/PUCCH in one CC, if the PUSCH of the primary cell is scheduled, the piggyback UCI is preferably transmitted always through the PUSCH of the primary cell.

When the PUSCH is scheduled in the primary cell, the UE can multiplex the UCI to the PUSCH of the primary cell regardless of the piggyback indicator or the CQI request.

Alternatively, even if the PUSCH is scheduled in the primary cell, if an indicated piggyback cell and a triggered piggyback cell are not the primary cell, the following operation is possible.

(1) The UCI can be multiplexed to the PUSCH of the primary cell by ignoring the indicated piggyback cell and the triggered piggyback cell.

(2) The UCI can be transmitted through the PUCCH by recognizing an error occurrence in a UL grant including the CQI request and/or the piggyback indicator.

(3) The whole UCI is dropped. That is, instead of multiplexing the UCI, only a UL transport block is transmitted on the PUSCH.

Figure 12:
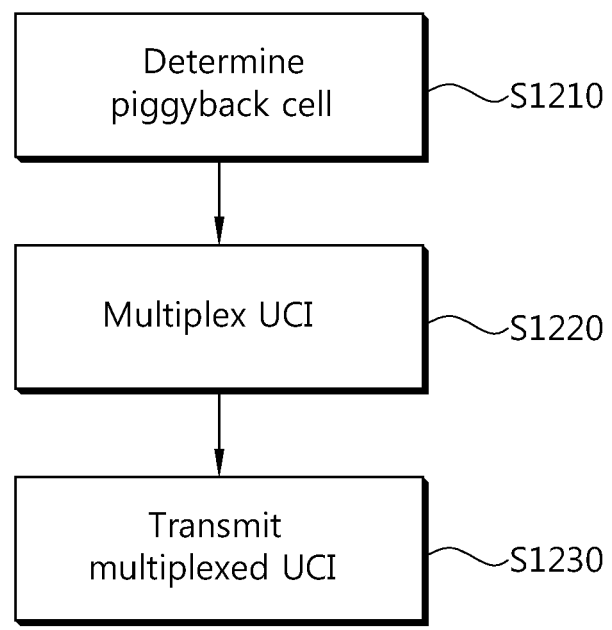
FIG. 12 is a flowchart showing UCI transmission according to an embodiment of the present invention.

FIG. 12 is a flowchart showing uplink control information (UCI) transmission according to an embodiment of the present invention.

A UE determines a piggyback cell in which UCI is multiplexed among a plurality of serving cells (step S1210). The piggyback cell may be any one of an indicated piggyback cell, a triggered piggyback cell, and a selected piggyback cell, as shown in the embodiments of FIG. 8 to FIG. 11. A type of the UCI to be multiplexed may differ depending on the piggyback cell.

The UE multiplexes the UCI on a PUSCH of the piggyback cell (step S1220). The UE transmits the multiplexed UCI on the PUSCH (step S1230).

Figure 13:
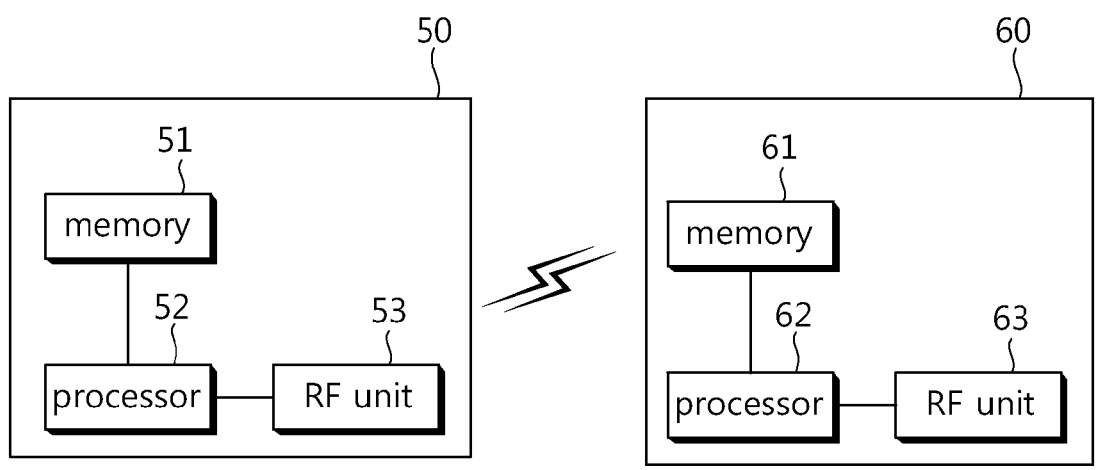
FIG. 13 is a block diagram showing a wireless communication system for implementing an embodiment of the present invention.

FIG. 13 is a block diagram showing a wireless communication system for implementing an embodiment of the present invention.

A BS 50 includes a memory 51, a processor 52, and a radio frequency (RF) unit 53. The memory 51 is coupled to the processor 52, and stores a variety of information for driving the processor 52. The RF unit 53 is coupled to the processor 52, and transmits and/or receives a radio signal. The processor 52 implements the proposed functions, processes, and/or methods. In the aforementioned embodiments, the operation of the BS 50 can be implemented by the processor 52. The processor 52 manages multiple cells, and schedules a PUSCH.

The UE 60 includes a memory 61, a processor 62, and an RF unit 63. The memory 61 is coupled to the processor 62, and stores a variety of information for driving the processor 62. The RF unit 63 is coupled to the processor 62, and transmits and/or receives a radio signal. The processor 62 implements the proposed functions, processes, and/or methods. In the aforementioned embodiments of FIG. 8 to FIG. 11, the operation of the UE 60 for transmitting UCI can be implemented by the processor 62.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of transmitting uplink control information in a wireless communication system, the method performed by a user equipment (UE) and comprising:
receiving, from a first cell among a plurality of serving cells, a first uplink grant including a first piggyback indicator for instructing the UE to piggyback both a first uplink transport block and uplink control information of the first cell onto a target cell;
receiving, from a second cell among the plurality of serving cells, a second uplink grant including a second piggyback indicator for instructing the UE not to piggyback a second uplink transport block of the second cell onto the target cell;
selecting the target cell on which the first uplink transport block and the uplink control information of the first cell are to be piggybacked among the plurality of serving cells, based on the first piggyback indicator in the first uplink grant,
wherein the target cell on which the first uplink transport block and the uplink control information of the first cell are to be piggybacked is selected among the plurality of serving cells except for the first and second cells, upon satisfying all three conditions including a first condition specifying if none of the first and second cells has a highest priority, a second condition specifying if none of the first and second cells is a primary cell and a third condition specifying if none of the first and second cells has a broadest bandwidth;
multiplexing the first uplink transport block and the uplink control information of the first cell onto an uplink shared channel of the target cell;
transmitting the uplink shared channel, onto which the first uplink transport block and the uplink control information of the first cell are multiplexed, to the target cell; and
transmitting the second uplink transport block to the second cell based on the second piggyback indicator in the second uplink grant.

2. The method of claim 1, wherein the target cell is indicated by the first uplink grant for the uplink shared channel.

3. The method of claim 1, wherein each of the first and second uplink grants includes a channel quality indicator (CQI) request for requesting a CQI report, and a serving cell in which the CQI request is triggered is determined to the target cell.

4. The method of claim 1, wherein the selecting of the target cell comprises selecting a top-priority cell, in which the uplink shared channel is scheduled, as the target cell among the plurality of serving cells.

5. The method of claim 4, wherein the top-priority cell is the primary cell.

6. The method of claim 5, wherein the selecting of the target cell comprises:
if the uplink shared channel of the top-priority cell is not scheduled, selecting at least one scheduled serving cell in which the uplink shared channel is scheduled among the plurality of serving cells; and
selecting a cell having a lowest index to the target cell among the at least one scheduled serving cell.

7. The method of claim 6, wherein the uplink control information to be multiplexed includes a positive-acknowledgment (ACK)/negative-acknowledgement (NACK) for hybrid automatic repeat request (HARQ).

8. The method of claim 7, wherein the uplink control information to be multiplexed does not include a channel quality indicator (CQI).

9. The method of claim 1, wherein the uplink shared channel is a physical uplink shared channel (PUSCH).

10. A wireless apparatus for transmitting uplink control information in a wireless communication system, the wireless apparatus comprising:
a radio frequency (RF) unit for transmitting and receiving a radio signal; and
a processor operatively coupled to the RF unit and configured to:

receive, from a first cell among a plurality of serving cells, a first uplink grant including a first piggyback indicator for instructing the UE to piggyback both a first uplink transport block and uplink control information of the first cell onto a target cell;

receive, from a second cell among the plurality of serving cells, a second uplink grant including a second piggyback indicator for instructing the UE not to piggyback a second uplink transport block of the second cell onto the target cell;

select the target cell in which the first uplink transport block and the uplink control information of the first cell are to be piggybacked among the plurality of serving cells, based on the first piggyback indicator in the first uplink grant, wherein the target cell on which the first uplink transport block and the uplink control information of the first cell are to be piggybacked is selected among the plurality of serving cells except for the first and second cells, upon satisfying all three conditions including a first condition specifying if none of the first and second cells has a highest priority, a second condition specifying if none of the first and second cells is a primary cell and a third condition specifying if none of the first and second cells has a broadest bandwidth;

multiplex the first uplink transport block and the uplink control information of the first cell onto an uplink shared channel of the target cell;

transmit the uplink shared channel, onto which the first uplink transport block and the uplink control information are multiplexed, to the target cell; and transmit the second uplink transport block to the second cell based on the second piggyback indicator in the second uplink grant.

11. The wireless apparatus of claim 10, wherein the target cell is indicated by the first uplink grant for the uplink shared channel.

12. The wireless apparatus of claim 10, wherein each of the first and second uplink grants includes a channel quality indicator (CQI) request for requesting a CQI report, and a serving cell in which the CQI request is triggered is determined to the target cell.

13. The wireless apparatus of claim 10, wherein the processor is further configured to select a top-priority cell, in which the uplink shared channel is scheduled, as the target cell among the plurality of serving cells.

* * * * *